United States Patent Office 3,424,707
Patented Jan. 28, 1969

3,424,707
THERMOPLASTIC POLYHYDROXY ETHER AND LIQUID EPOXY COMPOSITIONS
Roy H. Schaufelberger, Basking Ridge, N.J., assignor to Union Carbide Corporation, a corporation of New York
No Drawing. Continuation-in-part of application Ser. No. 352,981, Mar. 18, 1964. This application Mar. 2, 1967, Ser. No. 619,939
U.S. Cl. 260—32.8    14 Claims
Int. Cl. C08g 30/14, 45/06; C09d 3/58

ABSTRACT OF THE DISCLOSURE

Thermosetting composition may be prepared by mixing 100 pts. of a liquid epoxy resin (epoxy equiv. 170–250) and 15 to 65 pts. of thermoplastic polyhydroxy ether prepared from the reaction of epichlorohydrin and polynuclear dihydric phenol in substantial equimolar quantities. In an example 88 pts. of the diglycidyl ether of bisphenol A were mixed with 12 pts. of butyl glycidyl ether and 20 pts. of a polyhydroxy ether prepared from the reaction of equimolar quantities of bisphenol A and epichlorohydrin.

---

This is a continuation-in-part of Ser. No. 352,981, filed Mar. 18, 1964 now abandoned.

This invention relates to epoxy resins improved in impact resistance, flexibility and toughness. More particularly, the invention relates to liquid epoxy resins wherein greater impact resistance, a higher degree of flexibility and greater toughness are achieved by the presence of a modifier but without significant deleterious effect on desirable epoxy resin properties such as solvent and chemical resistance.

Toughness is effectively measured by impact resistance and flexibility of structures formed from epoxy resins; coatings are a good index of overall toughness properties. Liquid epoxy resins based on diglycidyl ether of bisphenol-A with or without a reactive diluent such as butyl glycidyl ether and employing a polyamine hardener such as diethylene triamine produce brittle coatings on metal panels which consequently have poor impact values. Since epoxy resin coatings frequently find use in applications where environmental conditions require substantial thickness, brittleness and low impact are readily apparent. In fact, in some instances even the dimensional changes caused by normal temperature variations are sufficient to cause severe cracking of an epoxy resin coating system.

Heretofore, it has been attempted to improve the flexibility and impact resistance of cured liquid epoxy resin by the use of modifiers. Modifiers used can be classified as reactive or non-reactive. Reactive modifiers are generally high molecular weight polyamine or polyamide resins. Although initial flexibility is improved such cured epoxy resins deteriorate with aging, becoming more brittle, losing flexibility and impact resistance, as they age harden over a period of months. Nonreactive modifiers include low molecular weight plasticizers and resins. Because relatively large amounts of such materials are required to cause a perceptible benefit and because these materials are generally quite inferior to epoxy resins in solvent and chemical resistance, the overall performance of the resin suffers although flexibility and impact properties are improved.

It is an object of the present invention to provide liquid epoxy material containing systems curable to highly impact resistant, tough, flexible solids.

It is another object to provide such impact resistant, flexible and tough epoxy resins substantially unchanged in solvent and chemical resistance.

It is still another and specific object to provide base layers coated with impact resistant, flexible and tough epoxy resin.

Other objects will be evident from the ensuing description and claims.

It has now been discovered that these and other objects of the present invention are achieved with liquid epoxy resins containing in intimate admixture from 15 to 65 parts by weight of a thermoplastic polyhydroxyether per 100 parts by weight of epoxy resin.

There are provided in accordance with the present invention mixtures of epoxy group-containing liquid materials and thermoplastic polyhydroxyether, curable upon addition of conventional hardeners to impact resistant, tough modified epoxy resins having excellent solvent and chemical resistance. These curable mixtures can be employed in a wide variety of applications including electrical potting and other molding uses, coatings, adhesives, binders for various reinforcements including fiber reinforcement e.g. metal or glass fibers for fabrication of structures requiring excellent chemical resistance and a higher degree of toughness than unmodified cured epoxy resin can provide such as stamping dies and filament wound chemical tanks and tank cars.

The epoxy resins useful in the present invention when modified with thermoplastic polyhydroxyethers are those polyglycidyl ethers of polyhydric phenols having epoxide equivalents in the range of 170–250 as described on pp. 21–22 of the text Epoxy Resins by H. Lee and K. Neville, McGraw Hill Book Co., New York, 1957. These epoxy resins are viscous liquids at ambient room temperature of low molecular weight whose properties and preparation are described in the text of Lee and Neville cited above as well as in the text Epoxy Resins by I. Skeist, Reinhold Publishing Co., New York, 1962. This invention does not include solid epoxy resins, that is, those having melting points of about 25° C. and above and epoxide equivalents of about 275 to 4000.

The preferred ratio of thermoplastic polyhydroxyether to liquid epoxy resin is about 20 to 60 parts of the former to 100 parts of the latter although 15 to 65 parts of the former to 100 parts of the latter can also be used.

The invention disclosed herein relates to compositions in which the liquid epoxy resin is the major component and the physical properties of the cured composition are primarily those of a thermoset epoxy resin. This invention should not be confused with inventions relating to compositions wherein thermoplastic polyhydroxyethers are crosslinked with epoxy resins, as for example the one disclosed by R. E. Bayes et al. in U.S. 3,177,090. In the Bayes et al. patent polyhydroxyethers are crosslinked with from 1 to 100 percent of a stoichiometrically equivalent amount, based on the content of secondary aliphatic hydroxyl groups in the polyhydroxyether. For an epoxy resin having an epixode equivalent of 170–250, the ratios of the Bayes et al. patent correspond to a range of from 1700 parts of polyhydroxyether per 100 parts of epoxy resin to 126 parts of polyhydroxyether per 100 parts of epoxy resin.

Furthermore, it is believed that in the instant invention relating to modified liquid epoxy resins that the greater part of the thermoplastic polyhydroxyether modifier is present as such, even after curing, and not in a cross-linked state. The basis for this belief resides in the known rapid reaction rate of the curing of epoxy groups by reaction of the 1,2-epoxy group alone or by reaction of the 1,2-epoxy group with the curing agent as delineated in Lee and Neville, cited above. The reaction rate of 1,2-epoxy groups with secondary hydroxyl groups such as those present in thermoplastic polyhydroxyethers on the other hand is relatively slow.

The epoxy resins are hardened or cured by reaction in the presence of curing agents e.g. organic acids, organic acid anhydrides and primary and secondary amines. Examples of suitable cure agents include ethylene diamine, diethylene triamine, triethylene tetramine, dimethylamine propylamine, boron trifluoride monoethylamino complexes, hydroxy ethyl diethylene triamine, piperidine, α-methylbenzyl dimethylamine, tridimethyl amino methyl phenol, metaphenylene diamine, oxalic acid, phthalic anhydride, maleic anhydride, hexahydrophthalic anhydride, pyromellitic anhydride, chlorendic anhydride and the like.

The term "thermoplastic polyhydroxyether" as used herein refers to reaction products of substantially equimolar quantities of a dihydric phenol and epichlorohydrin having a degree of polymerization of at least 30 but preferably 80 or more.

Although it is convenient to represent a thermoplastic polyhydroxyether as having the repeating unit:

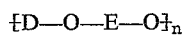

wherein D is the radical residuum of the dihydric phenol, E is the radical residuum of epichlorohydrin, and $n$ is an integer denoting the degree of polymerization and is at least 30 and preferably 80 or more and in the specific case where the dihydric phenol is bisphenol A, i.e., 2,2-bis(p-hydroxyphenyl)propane as having the repeating unit:

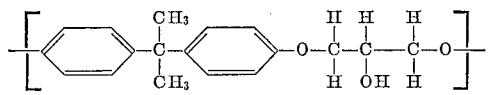

this is not an assertion that these thermoplastic polyhydroxyethers have only the configuration of pure linear polymers. For example some branching can occur by reaction of epichlorohydrin or dihydric phenol or both with pendant hydroxyl groups of the growing polyhydroxyether chain. Thus, the representation of the thermoplastic polyhydroxyethers in terms of the repeating unit:

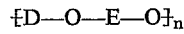

wherein D, E and $n$ are as defined above, is a useful tool for determining stoichiometry and the like but is not an accurate depiction of structure such as one may obtain for a monomer or a low molecular weight compound.

The thermoplastic polyhydroxyethers of the present invention are substantially free of 1,2-epoxy groups as evidenced by the application of the two "epoxide equivalent" analytical tests described in "Epoxy Resins" by H. Lee and K. Neville, pp. 21–25, McGraw Hill Book Co., Inc., N.Y. (1957). In the first test which involves the reaction of 1,2-epoxy groups with a known amount of hydrochloric acid followed by back-titration of the acid consumed, no hydrochloric acid was consumed. In the second test in which the infrared absorbance at 10.95 and 11.60μ (wave lengths at which 1,2-epoxy groups absorb light) no absorbance was demonstrated by the thermoplastic polyhydroxyethers. Thus it may be concluded that within the experimental limits of these standard tests no 1,2-epoxy groups are present in these thermoplastic polyhydroxyethers.

The dihydric phenol contributing the phenol radical residuum, D, can be either a dihydric mononuclear phenol such as hydroquinone and resorcinol or a dihydric polynuclear phenol such as those having the general formula:

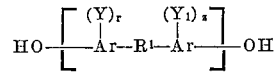

wherein $Ar$ is an aromatic divalent hydrocarbon such as naphthylene and, preferably, phenylene, Y and $Y_1$ which can be the same or different are alkyl radicals, preferably having from 1 to 4 carbon atoms, halogen atoms i.e. fluorine, chlorine, bromine and iodine, or alkoxy radicals, preferably having from 1 to 4 carbon atoms, $r$ and $z$ are integers having a value from 0 to a maximum value corresponding to the number of hydrogen atoms on the aromatic radical $(Ar)$ which can be replaced by substituents and $R^1$ is a bond between adjacent carbon atoms as in dihydroxydiphenyl or is a divalent radical including, for example,

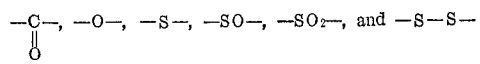

and divalent hydrocarbon radicals such as alkylene, alkylidene, cycloaliphatic e.g. cycloalkylene and cycloalkylidene, halogenated, alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an $Ar$ group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include, among others:

The bis-(hydroxyphenyl)-alkanes such as 2,2-bis-(4-hydroxyphenyl)propane,
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorphenyl)ethane,
1,1-bis(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis(2-isopropyl-4-hydroxyphenyl)propane,
2,2-bis(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
bis-(4-hydroxyphenyl)cyclohexylmethane,
1,2-bis-(4-hydroxyphenyl-1,2-bis-(phenyl)propane,
2,2-bis-(4-hydroxyphenyl)-1-phenyl-propane
and the like;

di(hydroxyphenyl)sulfones such as
bis-(4-hydroxyphenyl)sulfone,
2,4'-dihydroxydiphenyl sulfone,
5'-chloro-2,4'-dihydroxydiphenyl sulfone,
5'-chloro-4,4'-dihydroxydiphenyl sulfone,
and the like;

di(hydroxyphenyl)ethers such as bis-(4-hydroxyphenyl)ether, the 4,3'- 4,2'-, 2,2'-, 2,3'-, dihydroxydiphenyl ethers, 4,4'-dihydroxy-2,6-dimethyldiphenyl ether, bis-(4-hydroxy-3-isobutylphenyl)ether, bis - (4 - hydroxy-3-isopropylphenyl) ether, bis-(4-hydroxy-3-chlorophenyl)ether, bis-(4-hydroxy-3-fluorophenyl)ether, bis-(4-hydroxy-3-bromophenyl)ether, bis-(4-hydroxynaphthyl)ether, bis-(4-hydroxy - 3 - chloronaphthyl)ether, bis-(2-hydroxydiphenyl)ether, 4,4'-dihydroxy-2,6-dimethoxydiphenyl ether, 4,4'-dihydroxy-2,5-diethoxydiphenyl ether, and the like;

Also suitable are the bisphenol reaction products of 4-vinylcyclohexene and phenols, e.g. 1,3-bis(p-hydroxyphenyl)-1-ethylcyclohexane, and the bisphenol reaction products of dipentene or its isomers and phenols such as 1,2-bis-(p-hydroxyphenyl)-1-methyl - 4 - isopropylcyclohexane as well as bisphenols such as 1,3,3-trimethyl-1-(4-hydroxyphenyl) - 6 - hydroxyindane, and 2,4-bis-(4-hydroxyphenyl)-4-methylpentane, and the like.

Particularly desirable dihydric polynuclear phenols have the formula

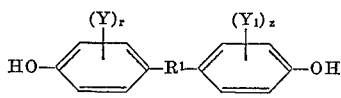

wherein Y and $Y_1$ are as previously defined $r$ and $z$ have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 10 carbon atoms.

The composition of the present invention can include the usual additives for thermoplastic or thermosetting resins such as pigments, colorants, opacifiers, lubricants, fillers, extenders and the like.

These additives can be added to either the epoxy or polyhydroxyether component or to the mixture of the composition components at any time prior to final cure.

The particular mode of incorporation of the thermoplastic polyhydroxyether with the epoxy containing material is not generally critical for many applications such as molding compositions, where blending, tumbling, stirring, milling and like techniques, of intimate mixing can be used. Coatings whether for adhesive or protective and/or decorative purposes can be prepared by dissolving the polyhydroxyether component and the epoxy component in the same or compatible solvents, either before or after mixing the components. Although the diglycidyl ether of bisphenol-A and thermoplastic polyhydroxyether are widely compatible, the introduction of certain amine components causes incompatibility and where clear or translucent mixtures are desired care must be taken to employ a solvent for the system in which the combined components will dissolve. For example in a system comprising thermoplastic polyhydroxyether, diglycidyl ether of bisphenol-A and an aliphatic polyamine such as diethylene triamine, a ketone such as methyl ethyl ketone or acetone is desirably employed to form a compatible solution possibly through the mechanism of a "Schiff" base. Dry films in any event appear to contain completely compatible components.

For coating with solutions a wide variety of solvents can be employed. Typical and illustrative solvents are methyl ether ketone, tetrahydrofuran, mesityl oxide, dimethyl formamide, methyl Cellosolve acetate $(CH_3COOCH_2CH_2OCH_3)$ butyl carbitol $(CH_4H_9OC_2H_4OC_2H_4OH)$, butyl Cellosolve $(C_4H_9OCH_2CH_2OH)$, diethyl Carbitol $(O(C_2H_4OC_2H_5)_2)$, diacetone alcohol, epoxy diglycol, dioxane, dimethyl sulfoxide and pentoxone and mixtures of the foregoing, e.g. toluene:butanol 60:40, methyl ethyl ketone:toluene 1:1, methyl ethyl ketone:Cellosolve acetate:toluene 38:47:15. The solvent based coatings are generally baked, although room temperature solvent evaporation is sufficient to give an adequate coating. Baking for 15 minutes at 300° F. or 5 minutes at 350° F. is preferred for maximum adhesion. Hot melt coatings can also be applied.

The following examples illustrate the compositions of the present invention. All parts and percentages are by weight unless otherwise stated.

EXAMPLE 1

The thermoplastic polyhydroxyether used was prepared by the reaction of equimolar amounts of 2,2,-bis(4-hydroxyphenyl)propane and epichlorohydrin together with sodium hydroxide. Equipment used was a vessel provided with an agitator, thermometer, and reflux means. There was placed in the vessel:

| | Parts |
|---|---|
| 2,2-bis(4-hydroxyphenyl)propane | 114.5 |
| Epichlorohydrin (99.1%) pure | 46.8 |
| Ethanol | 96.0 |
| Butanol | 10.0 |
| Sodium hydroxide (97.5%) pure | 22.6 |
| Water | 70.0 |

The above mixture was stirred at room temperature for 16 hours to accomplish the initial coupling reaction. The mixture was then heated at 80° C. for an hour. Sixty parts of a 7:3 mixture of toluene:butanol was added to the vessel. Heating of the mixture at 80° C. was continued another two hours. There was added to the vessel an additional 50 parts of the 7:3 toluene:butanol mixture and 4.5 parts of phenol. The contents of the vessel were continued heated at 80° C. (reflux) for 2½ hours. Upon cooling, the reaction mixture was cut with 200 parts of the 7:3 toluene:butanol mixture. One hundred parts of water was added to the vessel and agitated with the contents to dissolve salts present in the reaction mixture. The vessel contents were allowed to settle for ten minutes during which time a lower brine phase formed. This lower phase was separated by decantation. The upper polymer solution containing phase was washed successively with two 160 part portions of water and a mixture of 85% phosphoric acid with 100 parts of water (pH=2) for one hour. The upper polymer solution phase was again separated by decantation and water washed with four successive 200 part portions of water containing 4.5% butanol. The washed polymer was then coagulated in isopropanol, filtered, and dried.

A series of cold rolled steel panels were coated with a solution of a composition comprising the diglycidyl ether of bisphenol-A (88 parts) and butyl glycidyl ether (12 parts) for a total of 100 parts, the above thermoplastic polyhydroxyether (20 parts) and diethylene triamine (11 parts) which has been prepared by adding a solution of the thermoplastic polyhydroxyether in methyl ethyl ketone to a mixture of the epoxy material and the amine. A compatible mixture resulted. Each panel was dipped in the solution for a period and for a number of times sufficient to get the desired coating thickness and then oven dried at 350° F. for 15 minutes. One set of panels was dried at room temperature to determine blushing characteristics. Final coating thicknesses ranged from 0.8 to 1.5 mil in thinly coated panels and was over 2.0 mils on other panels. Each panel was tested for coating adhesion by the rapid stripping of conventional cellophane tape from the coated surface; for impact resistance by the Gardner Impact test; for flexibility by a ⅛" mandrel bend; and for solvent resistance by spot contact with acetone and toluene. Results are summarized in the table below.

Wood, glass and fabric substrates can similiarly be coated. Bis-(2,3-epoxycyclopentyl) ether can be substituted for the diglycidyl ether here used.

EXAMPLE 2

Example 1 was duplicated but using 40 parts of the thermoplastic polyhydroxyether per 100 parts of epoxy composition. Results are summarized in the table below.

EXAMPLE 3

Example 1 was duplicated but using 60 parts of the thermoplastic polyhydroxyether per 100 parts of epoxy composition. Results are summarized in the table below.

Control

Example 1 was duplicated but omitting the thermoplastic polyhydroxyether to provide a conventional epoxy resin system. Results are summarized in the table below.

TABLE

| Example | Coating composition | Coating thickness (mils) | Scotch tape adhesion | Gardner impact (in.-lb.) | 1/8" mandrel bend | Acetone spot test | Toluene spot test |
|---|---|---|---|---|---|---|---|
| Control | Epoxy[1]/DETA[2] 100/11 | 0.8–1.5 | Excellent | 20 | Fail | Soft | Pass. |
|  |  | 2.0+ | ....do.... | 20 | ....do.... | ....do.... | Do. |
| 1 | Epoxy/PHE[3]/DETA 100/20/11 | 0.8–1.5 | ....do.... | 140 | Pass | ....do.... | Do. |
|  |  | 2.0+ | ....do.... | 20 | Fail | ....do.... | Do. |
| 2 | Epoxy/PHE/DETA 100/40/11 | 0.8–1.5 | ....do.... | 160 | Pass | Sl./soft | Do. |
|  |  | 2.0+ | ....do.... | 80 | ....do.... | ....do.... | Do. |
| 3 | Epoxy/PHE/DETA 100/60/11 | 0.8–1.5 | ....do.... | 160 | ....do.... | ....do.... | Do. |
|  |  | 2.0+ | ....do.... | 140 | ....do.... | ....do.... | Do. |

[1] Mixture 88/12 of diglycidyl ether of bisphenol-A and butyl glycidyl ether.
[2] Diethylene triamine.
[3] Thermoplastic polyhydroxyether.

In all instances the blushing tendencies of the air dried coatings were improved over those of the air dried control.

Inspection of the table reveals that all systems exhibited (1) excellent adhesion, (2) excellent toluene resistance and (3) equivalent acetone resistance, with the system containing greater proportions of thermoplastic polyhydroxyether (Examples 2 and 3) somewhat better in this regard. In impact resistance, the presence of thermoplastic polyhydroxyether improved all thin coatings (Examples 1, 2, and 3) and when used in somewhat greater proportion improved the impact resistance of the thicker coatings (>2 mils) as well (Examples 2 and 3). The use of thermoplastic polyhydroxyether provided several fold improvements in impact resistance in most instances.

Similarly, in the flexibility test, the 1/8" mandrel bend, all the thinner coatings were greatly improved and the thicker coatings containing over 40 parts of thermoplastic polyhydroxyether were also improved.

Remarkably these improvements were achieved without loss of solvent resistance properties.

Reinforced structures fabricated by coating reinforcement such as glass or metal fiber and then arranging or compacting into a structure are also improved in flexibility. Upon drying the resin system both coats and bonds the fibers together.

What is claimed is:

1. Composition comprising liquid epoxy resin having an epoxy equivalent of 170–250 and per 100 parts thereof from 15 to 65 parts by weight of a thermoplastic polyhydroxyether reaction product of substantially equimolar quantities of a polynuclear dihydric phenol and epichlorohydrin substantially free of 1,2 epoxy groups having the general formula $$\{D\text{—}O\text{—}E\text{—}O\}_n$$

wherein D is the radical residuum of a polynuclear dihydric phenol, E is an hydroxyl containing radical residuum of epichlorohydrin, and $n$, the degree of polymerization, is at least 30.

2. Composition claim in claim 1 wherein the dihydric phenol is a bis(hydroxyphenyl) alkane.

3. Composition claimed in claim 2 wherein the bis(hydroxyphenyl) alkane is 2,2-bis(4-hydroxyphenyl) propane.

4. Article having an impact resistant, chemical and solvent resistant coating comprising a substrate and adhering thereto as a coating a composition comprising a liquid epoxy resin having an epoxy equivalent of 170–250 cured with a curing agent and incorporated therein from 15 to 65 parts by weight of a thermoplastic polyhydroxyether reaction product of substantially equimolar quantities of a polynuclear dihydric phenol and epichlorohydrin substantially free of 1,2 epoxy groups having the general formula $$\{D\text{—}O\text{—}E\text{—}O\}_n$$

wherein D is the radical residuum of a polynuclear dihydric phenol, E is an hydroxyl containing radical residuum of epichlorohydrin and $n$, the degree of polymerization, is at least 30.

5. Article claimed in claim 4 wherein the substrate is metal.

6. Article claimed in claim 4 wherein the substrate is wood.

7. Article claimed in claim 4 wherein the substrate is glass.

8. Article claimed in claim 4 wherein the cure agent is a polyamine.

9. Composition claimed in claim 1 wherein there is a cure agent present.

10. Composition claimed in claim 9 wherein the cure agent is a polyamine.

11. Composition claimed in claim 1 dissolved in a ketone solvent.

12. Composition claimed in claim 11 dissolved in methyl ethyl ketone.

13. Composition claimed in claim 11 dissolved in acetone.

14. Composition claimed in claim 11 wherein the solution contains an aliphatic polyamine cure agent.

References Cited

UNITED STATES PATENTS 3,177,090   4/1965   Bayes _____ 260—830

SAMUEL H. BLECH, *Primary Examiner.*

PAUL LIEBERMAN, *Assistant Examiner.*

U.S. Cl. X.R.

260—47, 830, 30.4, 78.4, 32.8, 32.6, 30.8, 31.4, 33.2; 117—132, 148, 124